UNITED STATES PATENT OFFICE.

EDWARD C. L. KRESSEL, OF CAMDEN, NEW JERSEY, ASSIGNOR TO WILCKES, MARTIN, WILCKES CO., OF NEW YORK, N. Y., A CORPORATION OF NEW YORK.

BAKING PREPARATION.

1,134,956.  Specification of Letters Patent.  Patented Apr. 6, 1915.

No Drawing.  Application filed January 15, 1914.  Serial No. 812,268.

*To all whom it may concern:*

Be it known that I, EDWARD C. L. KRESSEL, a citizen of the German Empire, residing at Camden, in the county of Camden and State of New Jersey, have invented certain new and useful Improvements in Baking Preparations, fully described in the following specification.

This invention relates to a leavening agent, and it comprises, as a new article of manufacture, a baking powder or leavening agent containing a carbonate of an alkali forming metal, which is best sodium bicarbonate, and an acid component containing, or consisting of, an acid body containing the mellitic group or radical, such as mellitic acid, acid mellitates, etc., with or without other acid agents, said leavening preparation advantageously containing also a filler, such as starch, milk sugar, etc., the acid agent and the bicarbonate being either in a mixed condition as in a baking powder or in preparations adapted to be used successively, all as more fully hereinafter set forth and as claimed.

Very many baking powder preparations are on the market for one use or another. Cream of tartar is an acid component often used. Bicarbonate of sodium is generally the alkaline component, or the component yielding the carbon dioxid, the leavening gas. Instead of cream of tartar, acid phosphate of lime or other acid phosphates are frequently used. Baking powders with these acid components, however, in use have a number of disadvantages, and particularly when used for some special purposes. The acid phosphate agents are more or less hygroscopic, which leads to deterioration of the powder in time. Cream of tartar is rather too slow in coming into action for some purposes and if a little tartaric acid be added to it, as is frequently the case, the preparation becomes a little hygroscopic. For some purposes, on the other hand, the acid phosphate baking powders are too rapid in action, as in bench work in bakeries where dough mixtures are often left a considerable time before being baked.

I have discovered that mellitic acid is of special utility as an acid agent for baking powders and for leavening purposes generally; being used either as a free acid or as one of the acid reacting salts or esters. For some purposes I find the free acid the most advantageous form, while for other purposes some of the acid mellitates and particularly the dicalcium or dimagnesium mellitate, are most useful.

Mellitic acid is occasionally found in nature as an alumina salt in the so called "honey-stone"; but it is otherwise at present a laboratory curiosity. It has been prepared in small quantities by oxidizing charcoal, coal, boneblack, lampblack, with nitric acid or the like; also by electrolytic action using carbon electrodes in an acid or alkaline electrolyte. These sources, however, are little productive, and I prefer to make the acid in other ways. In practice, it is better to produce it by the direct oxidation of hexamethylbenzene, $C_6(CH_3)_6$. Hexamethylbenzene may be made from benzene, or benzol, or homologues containing methyl groups, such as toluol, xylol, mesitylene, durol, etc., by the well known Friedel and Crafts reaction with aluminum chlorid and methyl chlorid. The hexamethylbenzene may be oxidized to convert its methyl group into carboxyl by any of the usual oxidizing agents such as permanganate, nitric acid, etc. Electrolytic oxidation may be employed. I find it particularly advantageous, however, to employ hydrogen peroxid or a metallic peroxid, such as sodium peroxid, as an oxidizing agent as it gives me a product requiring less purification than when some other oxidants are used and there is also less loss by side reactions. Hydrogen peroxid may be used in the theoretical or a greater proportion, that is, eighteen molecules or more of hydrogen peroxid for each molecule of hexamethylbenzene. Using hydrogen peroxid, mellitic acid and water are produced. With sodium peroxid, sodium mellitates are produced from which mellitic acid can be readily recovered in any of the usual ways. However produced, the mellitic acid should be purified, as by crystallization from a suitable solvent, if necessary. When made with the aid of hydrogen peroxid it is generally quite pure.

Mellitic acid crystallizes in fine needles containing no water of crystallization; is easily soluble in water but is not hygroscopic, and is very stable, being soluble without decomposition in oil of vitrol. It forms salts with all bases, and many of these salts, when of acid nature, may like the free acid be used as acid components of baking powder. Either the dicalcium mellitate $$(Ca_2H_2C_6(CO_2)_6, \text{ or } Ca_2H_2C_{12}O_{12})$$

or the dimagnesium mellitate $$(Mg_2H_2C_6(CO_2)_6, \text{ or } Mg_2H_2C_{12}O_{12})$$

is a very good acid agent for the present purposes. They are nearly equivalent, pound for pound, to cream of tartar and may be used to replace it in the ordinary baking powder compositions without much change of the proportions of filler and bicarbonate. Mellitic acid is substantially a hexabasic acid. With certain indicators, such as helianthin, Kongo red, etc., it reacts as a tribasic acid, but with other indicators, such as phenolphthalein, it reacts as a hexabasic acid. For baking powder purposes it may be taken as hexabasic. A good composition, using mellitic acid alone as the acid component and employing 44% filler may be made by assembling 18 pounds of finely powdered pure crystallized mellitic acid, 26 pounds of good finely powdered pure sodium bicarbonate, and 44 pounds of pure dry starch or milk sugar. Another composition using dicalcium mellitate may be made by using 65 pounds of dicalcium mellitate, 25 pounds of sodium bicarbonate and 10 of filler. Mellitic acid having a much greater acid power than the usual cream of tartar or acid calcium phosphate, in making baking powders intended to yield about the same amount of leavening gas as the ordinary type of powder, a correspondingly less quantity of mellitic acid should be employed, the weight being made up in starch or other filler. For example, a baking powder having the standard leavening qualities of ordinary baking powder is made with 18 pounds of mellitic acid, 26 pounds of bicarbonate of sodium, and 44 pounds of starch or other filler. In lieu of mellitic acid or acid mellitates, the acid mellitic esters such as the various methyl, ethyl, etc., esters may be used.

As stated, in lieu of using free mellitic acid, that is, mellitic acid not combined with a base, I may of course use the acid mellitates, mellitic anhydrids, acid mellitic esters, or any other acid reacting body containing the mellitic group or radical $C_6(CO_2)_6$. Mellitic acid, or the said acid mellitates are a useful addition to the ordinary type of cream of tartar baking powder. Cream of tartar baking powders, owing to the comparative insolubility of cream of tartar are rather slow in coming into action and tartaric acid is frequently added to accelerate initial action. Instead of using tartaric acid which is more or less hygroscopic, free mellitic acid or an acid mellitate may be used to advantage.

When so desired, in lieu of using the mellitic acid or the acid mellitate (as the case may be) intimately commingled with the bicarbonate, as in a baking powder, or in a preparation such as a so-called self-rising flour or a dough ready for baking, equivalent proportions of each may of course be put up separately to form a preparation to be added to the dough.

What is claimed is:

1. A baking powder comprising a carbonate of an alkali forming metal and an acid component containing the mellitic acid radical.

2. A baking preparation comprising a bicarbonate of an alkali forming metal and an acid component, said acid component comprising an acid material containing the mellitic radical.

3. A baking preparation comprising a carbonate of an alkali forming metal and an acid mellitate.

4. A baking powder comprising equivalent quantities of an acid mellitate and of a carbonate of an alkali forming metal, and a filler.

5. A baking powder comprising equivalent quantities of dicalcium mellitate and of a bicarbonate of an alkali forming metal.

6. A baking powder comprising equivalent quantities of dicalcium mellitate and of a bicarbonate of an alkali forming metal, and a filler.

7. A baking powder comprising equivalent quantities of an acid mellitate and of bicarbonate of sodium.

8. A baking powder comprising equivalent quantities of dicalcium mellitate and of bicarbonate of sodium, and a filler.

In testimony whereof I have hereunto set my hand in the presence of two subscribing witnesses.

Dr. EDWARD C. L. KRESSEL.

Witnesses:
Mont Shinn,
C. Chester Craig.